(12) United States Patent
Soethje et al.

(10) Patent No.: US 10,501,600 B2
(45) Date of Patent: Dec. 10, 2019

(54) PROCESS FOR RECYCLING MATERIALS CONTAINING BENZOXAZINE RESIN, ESPECIALLY FIBER COMPOSITE PLASTICS CONTAINING BENZOXAZINE RESIN

(71) Applicant: Fraunhofer-Gesellschaft zur Foerderung der angewandten Forschung e.V., Munich (DE)

(72) Inventors: Dominik Soethje, Berlin (DE); Christian Dreyer, Niederwoerresbach (DE); Monika Bauer, Koenigs Wusterhausen (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 31 days.

(21) Appl. No.: 15/745,948

(22) PCT Filed: Jul. 14, 2016

(86) PCT No.: PCT/EP2016/066835
§ 371 (c)(1),
(2) Date: Jan. 18, 2018

(87) PCT Pub. No.: WO2017/012997
PCT Pub. Date: Jan. 26, 2017

(65) Prior Publication Data
US 2018/0208737 A1    Jul. 26, 2018

(30) Foreign Application Priority Data

Jul. 22, 2015 (DE) .................. 10 2015 111 939

(51) Int. Cl.

| | |
|---|---|
| *B29B 17/02* | (2006.01) |
| *C08J 11/28* | (2006.01) |
| *C08G 18/64* | (2006.01) |
| *C08G 18/65* | (2006.01) |
| C08G 101/00 | (2006.01) |
| B29K 277/00 | (2006.01) |
| B29K 307/04 | (2006.01) |
| B29K 309/08 | (2006.01) |
| B29K 311/10 | (2006.01) |

(52) U.S. Cl.
CPC ............... *C08J 11/28* (2013.01); *B29B 17/02* (2013.01); *C08G 18/64* (2013.01); *C08G 18/6511* (2013.01); B29K 2039/00 (2013.01); B29K 2277/00 (2013.01); B29K 2307/04 (2013.01); B29K 2309/08 (2013.01); B29K 2311/10 (2013.01); C08G 2101/00 (2013.01); C08J 2377/00 (2013.01); C08J 2379/00 (2013.01); Y02W 30/706 (2015.05)

(58) Field of Classification Search
USPC ....................................................... 521/49.8
See application file for complete search history.

(56) References Cited

U.S. PATENT DOCUMENTS 5,691,388 A    11/1997    Bauer et al.

FOREIGN PATENT DOCUMENTS

| JP | 2013/103223 A | 5/2013 |
| WO | 2014/027104 A1 | 2/2014 |

OTHER PUBLICATIONS

S. Rimdusit et al., "Alloys and Composites of Polybenzoxazines", Springer Verlag, 2013, p. 1-46.
S. Rimdusit et al., "Thermomechanical Properties of Arylamine-Based Benzoxazine Resins Alloyed with Epoxy Resin", Polymer Engineering & Science, 51 (Nr. 9), 2011, p. 1797-1807).
S. Rimdusit et al., "Development of new class of electronic packaging materials based on ternary systems of benzoxazine, epoxy, and phenolic resins", Polymer, 41 (Nr. 22), 2000, p. 7941-7949.
C.H. Lin et al: "Miscibility, microstructure, and thermal and dielectric properties of reactive blends of dicyanate ester and diamine-based benzoxazine ", Macromolecules, Bd. 45, Sep. 7, 2012 (Sep. 7, 2012), pp. 7461-7466, XP002760557, American Chemical, Society ISSN: 0024-9297.

*Primary Examiner* — Terressa Boykin
(74) *Attorney, Agent, or Firm* — Duane Morris LLP

(57) ABSTRACT

The present invention relates to a process for chemically degrading materials containing benzoxazine resin, in particular benzoxazine resins, benzoxazine resin pre-polymers and benzoxazine resin-containing plastics, that enables a high quality recycling process for used up benzoxazine resin-containing materials, in particular the separation of composite materials, such as duromer-based fiber composite plastics containing a benzoxazine resin matrix, and reuse of the benzoxazine-containing materials.

17 Claims, 5 Drawing Sheets

Figure 1:
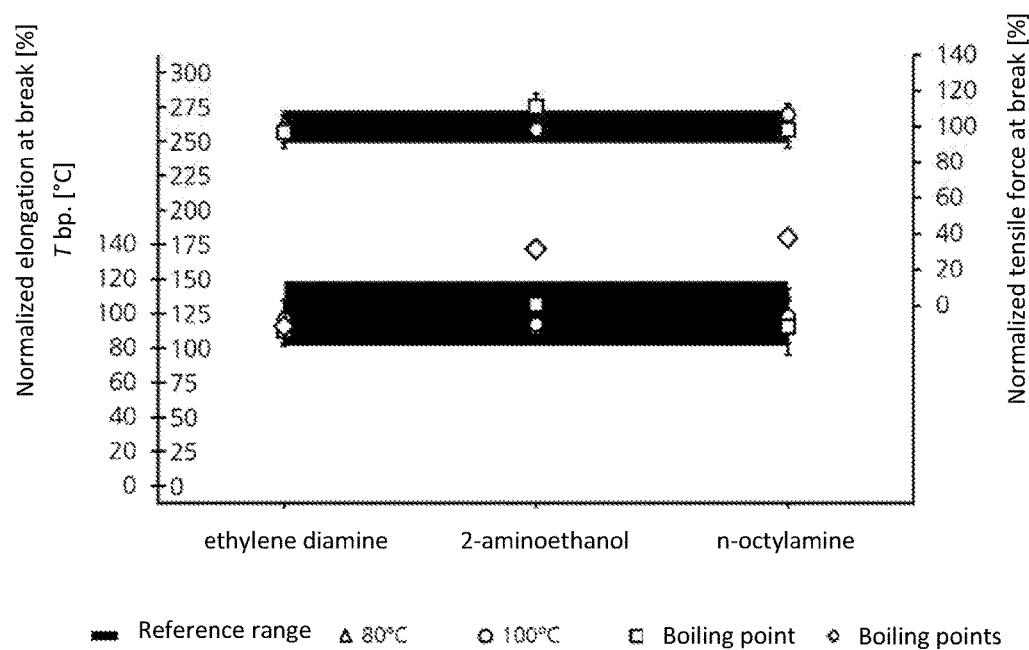

PROCESS FOR RECYCLING MATERIALS CONTAINING BENZOXAZINE RESIN, ESPECIALLY FIBER COMPOSITE PLASTICS CONTAINING BENZOXAZINE RESIN

The invention relates to a process for chemically degrading materials containing benzoxazine resin, in particular benzoxazine resins, benzoxazine resin pre-polymers and benzoxazine resin-containing plastics, that enables a high quality recycling process for used up benzoxazine resin-containing materials, in particular the separation of composite materials, such as duromer-based fiber composite plastics containing a benzoxazine resin matrix, and reuse of the benzoxazine-containing materials.

Benzoxazine resins are heterocyclic macromolecules, the heterocyclic ring of which contains nitrogen and oxygen and which further shares two carbon atoms with a benzene ring. In principle, benzoxazine resins can be produced by reaction of the following three compounds: a phenol derivative, formaldehyde, and a primary amine (see Scheme 1 below).

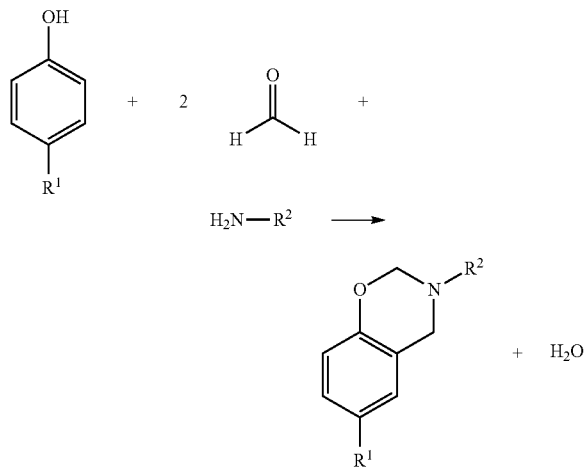

Typical representatives of benzoxazine resins are, for example, the monomers produced by Huntsman Corporation (Salt Lake City, USA) on the basis of aniline and bisphenol A, bisphenol F, thiodiphenol, dicyclopentadiene or phenolphthalein. Another manufacturer of benzoxazine resins is Henkel AG & Co. KGaA (Düsseldorf, Germany).

Benzoxazine resins are cured in a polyaddition reaction, and thus without cleavage of volatile substances, as shown in the following Scheme 2.

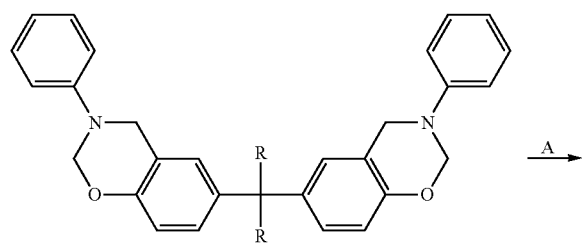

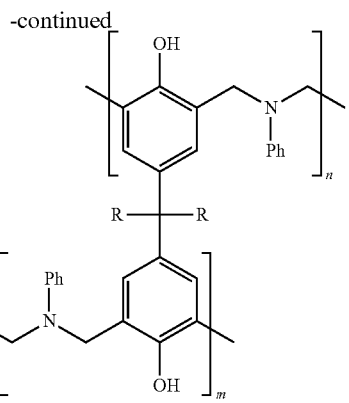

This leads to their good mechanical properties. In addition, benzoxazine resins can be copolymerized with various compounds in order to achieve a higher network density and therefore higher glass transition temperatures, among other properties, which are of paramount importance to achieve the thermomechanical properties and the thermal stability. Ishida and Allen (see S. Rimdusit et al., Eds, Alloys and Composites of Polybenzoxazines, Springer Verlag, 2013, p. 1-46; S. Rimdusit et al., Thermomechanical Properties of Arylamine-Based Benzoxazine Resins Alloyed with Epoxy Resin, Polymer Engineering & Science, 51 (No. 9), 2011, p. 1797-1807) studied the copolymerization with epoxy resins, with which a higher network density and thus a higher glass transition temperature is achieved. S. Rimdusit et al. also conducted studies on ternary systems consisting of polybenzoxazine resins, epoxy resins, and phenolic resins, see S. Rimdusit et al., Development of new class of electronic packaging materials based on ternary systems of benzoxazine, epoxy, and phenolic resins, Polymer, 41 (No. 22), 2000, p. 7941-7949. A positive effect in terms of the glass transition temperature was determined here as well. Other copolymerizations, for example, with polyimides, lignin or urethanes are also reported in the monograph Alloys and Composites of Polybenzoxazines, Springer Verlag, 2013, p. 1-46. Likewise, a copolymerization with cyanate resins is possible.

The high intrinsic flame resistance, the low water absorption, the low shrinkage during cure and the glass transition temperatures of up to 230° C. make this class of duromers interesting, in particular as matrix materials for fiber composite plastics.

According to the prior art, duromers or their products, in particular fiber composite plastics with a duromer matrix, can be recycled only with high energy- and/or time expenditure and therefore at a high cost. As three-dimensionally cross-linked plastics, duromers cannot be melted or solubilized and thus subjected to a simple recycling procedure analogous to the one used for thermoplastics or metals. The common option used in the past of disposing composite materials on an aboveground landfill at low cost and without pretreatment is no longer possible due to the change relating to municipal waste and the Ordinance on landfills and long-term storage, Landfill Ordinance (Deponieverordnung, DepV) that entered into force on May 2, 2013. Due to the requirements defined in Section 5 of the 17th BImSchV, Ordinance on the incineration and co-incineration of waste of May 2, 2013, the incineration of such materials is particularly difficult. These limits are often not achieved; therefore, according to the current status, they can be disposed of only in an underground landfill. However, this does not represent a solution that is acceptable in the long-term. Therefore, the most frequently employed reuse of duromer materials and their products up to now is by grinding and subsequent use as filler material. High quality recycling is, however, only guaranteed if quality products can be made from the recycled products.

The object of the invention is therefore to provide a process with which benzoxazine resin-containing materials can be chemically decomposed in such a manner that reusable products can be obtained from the benzoxazine resin-containing material. It should be possible to free the reinforcing fibers contained, for example, in fiber composite plastics with a benzoxazine resin-containing matrix from the plastic after the benzoxazine resin-containing matrix has been decomposed and to remove them without adherences and with properties close to those of new fibers.

This object is achieved with a process in which the benzoxazine resin-containing material is subjected to aminolysis with an agent containing at least one reactive $NH_2$ group or NH group. In the case of a fiber composite plastic having a benzoxazine resin matrix, almost none of the reinforcing fibers conventionally used are damaged, eg., carbon fibers, glass fibers, aramide fibers, natural fibers. In individual cases in which fibers are used that are sensitive to strongly basic amines, a special selection of the decomposition reagent is required.

A reactive $NH_2$ group and NH group within the meaning of the invention is understood as meaning any amino group capable of initiating an aminolysis reaction with benzoxazine resins. These are in particular ammonia, hydrazine, primary and secondary amines, hydrazines with aliphatic or aromatic residues that may be substituted. Thus, any primary amine of saturated or unsaturated, linear, branched, or cyclic aliphatic or aromatic hydrocarbons, the corresponding hydrazines, and of course ammonia and hydrazine as such be used for the reaction. The branching or chain length of the hydrocarbon residue does not play a role in the reaction as long as the amino function has sufficient reactivity toward the benzoxazine resins.

The primary and secondary amines used can have further substituents, depending on the desired substitution pattern of the reaction products. An additional amino function or hydroxyl function is especially advantageous and likewise any other substituents insofar as they do not adversely interfere with the reaction.

Accordingly, said method was or is preferably performed by aminolysis using an aminolysis reagent selected from an amine of the formula (1)

and/or an amine of formula (2)

(mixtures of said reagents in case of a combined use), where X is selected from —H (i.e., ammonia among others), —OH, —$NH_2$ and —$NHR^1$ and —$R^1$ is an aliphatic or aromatic hydrocarbon residue having in particular 1 to 20 carbon atoms that may be unsubstituted or substituted. X may instead be a group $R^2$—Y, where $R^2$ is a divalent aliphatic or aromatic hydrocarbon residue having in particular from 1 to 20 carbon atoms, and Y represents any residue, but in particular —H, —OH, —$NH_2$ or —$NHR^1$.

Z is an aliphatic or aromatic hydrocarbon residue having in particular from 1 to 20 carbon atoms that may be substituted. Z may in particular also be a group $R^3$-A, where $R^3$ is a divalent aliphatic or aromatic hydrocarbon residue having in particular from 1 to 20 carbon atoms, and A represents any divalent residue, but in particular —OH, —$NH_2$ or —$NHR^1$.

In the process according to the invention, the agent degrades the benzoxazine-containing starting materials to low molecular weight components that, following an appropriate refinement or without a refinement, can be directly reused, for example, to produce new duromers.

The process according to the invention is preferably performed at temperatures from −20° C. to +250° C., in particular up to the boiling point of the agent used. The at least one reactive agent containing an $NH_2$ group or NH group can simultaneously function as a suspending agent (for the starting material) and as a solvent (for the resulting substances). It may be present in diluted form, diluted by an (additional) solvent. If the reaction is performed under pressure, the temperature can also be increased above the boiling point of the agent used. By using appropriate amines, diamines, aminoalcohols or aminophenols, low molecular weight compounds are obtained with the inventive method that can be used as starting materials for the production of polyurethanes, melamine resins, epoxy resins, polyesters, polycarbonates, acrylic resins, polyperfluorcyclobutanes, phenolic resins, etc., which enables it to be classified as real material recycling.

Figure 10:
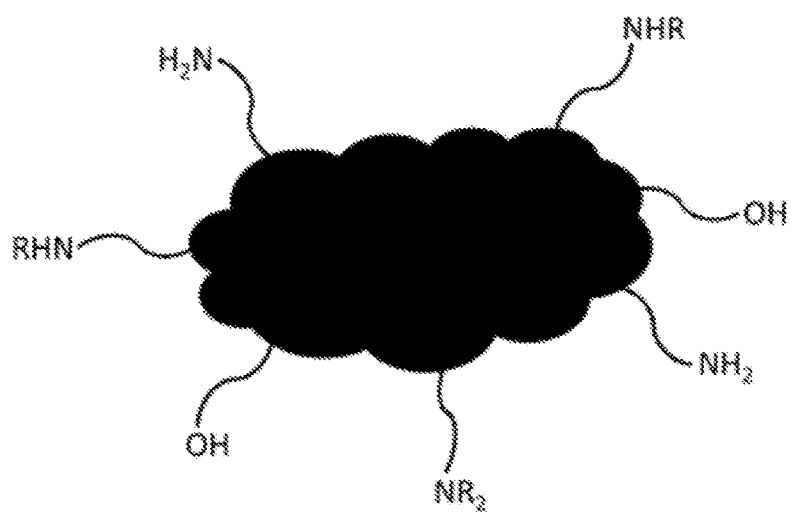

Since polymer networks can be produced by the reaction of the degradation products with isocyanates, the degradation products used for the reaction with the isocyanates must contain functional groups that can react with isocyanates. These are in particular terminal hydroxyl and amino compounds. Degradation products are often present, as shown in FIG. 10 (the "cloud" is intended to indicate the mass of degradation products, and the further groups shown in addition to said groups can be present as single substituents or as a combination of substituents on different degradation products). In addition to the isocyanates, in particular hydroxyl group-containing degradation products and and in part also amino group-containing degradation products can be reacted to the aforementioned polymer classes (e.g., epoxy resins, phenolic resins, polyesters, acrylic resins etc.) by reaction with, e.g., acid chlorides, acid anhydrides, epoxy resins, phenolic resins, etc.

The invention is further illustrated by the following exemplary embodiments.

EXEMPLARY EMBODIMENTS

Example 1

Preparation of Pure Benzoxazine Resin Plates.

For preparation of pure benzoxazine resin plates, bisphenol A-based benzoxazine resins were melted at 120° C., placed in an open aluminum mold, and cured according to the following curing protocol. Bisphenol F-based benzoxazine pure resin plates were prepared analogously.

| Temperature [° C.] | Time [min] |
|---|---|
| 120 | 30 |
| 120 to 150 | 30 |
| 150 | 60 |
| 150 to 180 | 30 |
| 180 | 60 |
| 180 to 200 | 30 |
| 200 | 180 |

Example 2

5 g cured bisphenol A-based benzoxazine resin and 2-aminoethanol were added at a mass ratio of 1:4 to a 50 ml round bottom flask with a Dimroth condenser and boiled for 6 hours and 45 minutes at 172° C. under reflux.

It was found that the starting material was quantitatively converted into products that are soluble in 2-aminoethanol. A clear solution was obtained.

A complete degradation of the polymer network was detected by GPC. The degradation products dissolved in THF all had a molecular weight of less than 4000 g·mol$^{-1}$.

Example 3

5 g cured bisphenol A-based benzoxazine resin and 2-ethylene diamine were added at a mass ratio of 1:4 to a 50 ml round bottom flask with a Dimroth condenser and boiled for 120 hours at 160° C. under reflux.

It was found that the starting material was quantitatively converted into products that are soluble in ethylene diamine. A clear solution was obtained.

Example 4

5 g cured bisphenol F-based benzoxazine resin and 2-aminoethanol were added at a mass ratio of 1:4 to a 50 ml round bottom flask with a Dimroth condenser and boiled for 35 minutes at 172° C. under reflux.

It was found that the starting material was quantitatively converted into products that are soluble in 2-aminoethanol. A clear solution was obtained.

A complete degradation of the polymer network was detected by GPC. The degradation products dissolved in THF all had a molecular weight of less than 4000 g·mol$^{-1}$.

Example 5

5 g cured bisphenol F-based benzoxazine resin and 2-ethylene diamine were added at a mass ratio of 1:4 to a 50 ml round bottom flask with a Dimroth condenser and boiled for 12 hours at 160° C. under reflux.

It was found that the starting material was quantitatively converted into products that are soluble in ethylene diamine. A clear solution was obtained.

Example 6

5 g cured bisphenol F-based benzoxazine resin and octylamine were added at a mass ratio of 1:4 to a 50 ml round bottom flask with a Dimroth condenser and boiled for 12 hours at 180° C. under reflux.

It was found that the starting material was quantitatively converted into products that are soluble in octylamine. A clear solution was obtained.

Example 7

5 g cured bisphenol F-based benzoxazine resin and N-methylethanolamine were added at a mass ratio of 1:4 to a 50 ml round bottom flask with a Dimroth condenser and boiled for 14 hours at 160° C. under reflux.

It was found that the starting material was quantitatively converted into products that are soluble in N-methylethanolamine. A clear solution was obtained.

Example 8

Preparation of Benzoxazine-Cyanate Copolymers

For the preparation of pure benzoxazine-cyanate resin plates, 31.8 g bisphenol A-based benzoxazine resin was melted at 120° C. and 57.4 g of bisphenol A-based cyanate (DCBA) molten at 80° C. was added. The mixture was then homogenized with a precision glass stirrer (KPG stirrer), added to an open aluminum mold, and cured according to the following curing protocol.

Further, benzoxazine cyanate pure resin plates were prepared using bisphenol F-based benzoxazine resin. To this end, 35.8 g bisphenol F-based benzoxazine resin was melted at 120° C. and 68.8 g of bisphenol A-based cyanate (DCBA) molten at 80° C. was added. The mixture was then homogenized with a precision glass stirrer (KPG stirrer), added to an open aluminum mold, and also cured according to the following curing protocol.

| Temperature [° C.] | Time [min] |
|---|---|
| 120 | 60 |
| 120 to 140 | 30 |
| 140 | 480 |
| 140 to 150 | 30 |
| 150 | 60 |
| 150 to 170 | 30 |
| 170 | 60 |
| 170 to 190 | 30 |
| 190 | 60 |
| 190 to 210 | 30 |
| 210 | 60 |
| 210 to 230 | 30 |
| 230 | 60 |
| 230 to 250 | 30 |
| 250 | 60 |

Example 9

5 g of a cured benzoxazine cyanate pure resin plate, consisting of a bisphenol A-based benzoxazine resin and bisphenol A-based cyanate, and 2-aminoethanol were added at a mass ratio of 1:4 to a 50 ml round bottom flask with a Dimroth condenser and boiled for 35 minutes at 172° C. under reflux.

It was found that the starting material was quantitatively converted into products that are soluble in 2-aminoethanol. A clear solution was obtained.

Example 10

5 g of a cured benzoxazine cyanate pure resin plate, consisting of bisphenol F-based benzoxazine resin and bisphenol A-based cyanate, and 2-aminoethanol were added at a mass ratio of 1:4 to a 50 ml round bottom flask with a Dimroth condenser and boiled for 35 minutes at 172° C. under reflux.

It was found that the starting material was quantitatively converted into products that are soluble in 2-aminoethanol. A clear solution was obtained.

Example 11

The fiber rovings and yarns to be tested were stored at different temperatures in different decomposition reagents in 50 ml round bottom flasks with Dimroth condenser. The fiber rovings treated with reagents were then washed with ethanol and dried at room temperature in a vacuum oven. Tensile tests were subsequently performed using an Instron 3369 with a 500 N load cell and a special module for testing filigree samples. The distance between the two chuck jaws and, accordingly, the measuring length was always 30 mm and the testing speed was set to 2.5 mm·min$^{-1}$.

To determine whether the washing procedure has an effect on the results, fibers were washed with ethanol, and their mechanical properties were compared with those of unwashed fibers. An effect of the washing process on the mechanical properties of any of the fiber types used here was not observed.

PAN-based 3K carbon fiber rovings (2,000 dtex), fiberglass rovings (E-glass, approx. 680 dtex), aramide fiber rovings (approx. 1,730 dtex), polyamide fiber rovings (PA 6, approx. 1.880 dtex) and twisted natural fibers (flax-based; approx. 530 dtex) were used.

In the experiments described below, each of the five selected types of fibers were stored for 1 h in each of three different reagents at the respective temperature and their mechanical properties were tested using tensile tests on fiber rovings or fiber yarns.

In the case of the carbon fibers, a significant effect on the mechanical properties was not recorded in any of the reagents at all three selected temperatures. FIG. 1 shows the results of the mechanical tensile tests on untreated and treated carbon fiber rovings.

Figure 2:
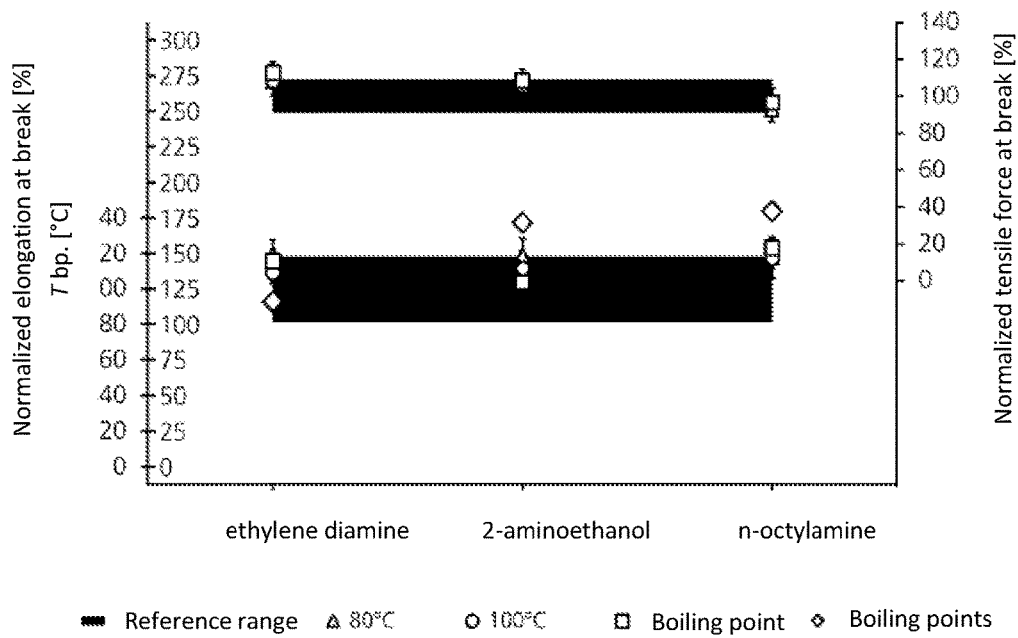

In the case of glass fibers, a worsening of the mechanical properties by treatment with the different reagents was not observed at any temperature within the measurement accuracy (see FIG. 2).

Figure 3:
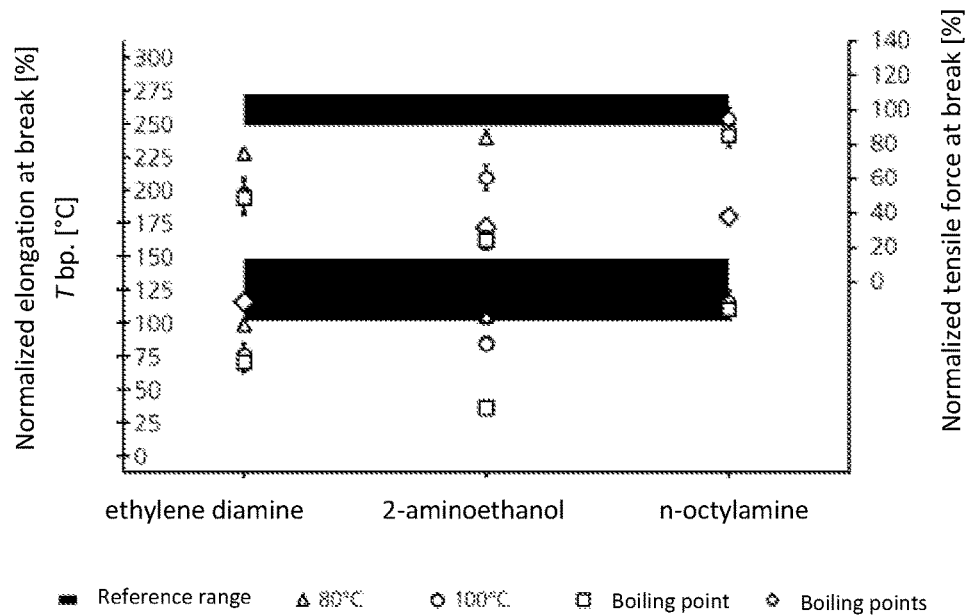

Aramid fibers are damaged by use of ethylene diamine or 2-aminoethanol. Especially in the case of 2-aminoethanol, a strong reduction of the mechanical properties was observed depending on the storage temperature. In these experiments, a correlation between tensile elongation and tensile strength of the fibers is also observed. If aramid fiber-reinforced composite plastics are to be recycled, it is recommended to use, for example, n-octylamine (see FIG. 3).

Figure 4:
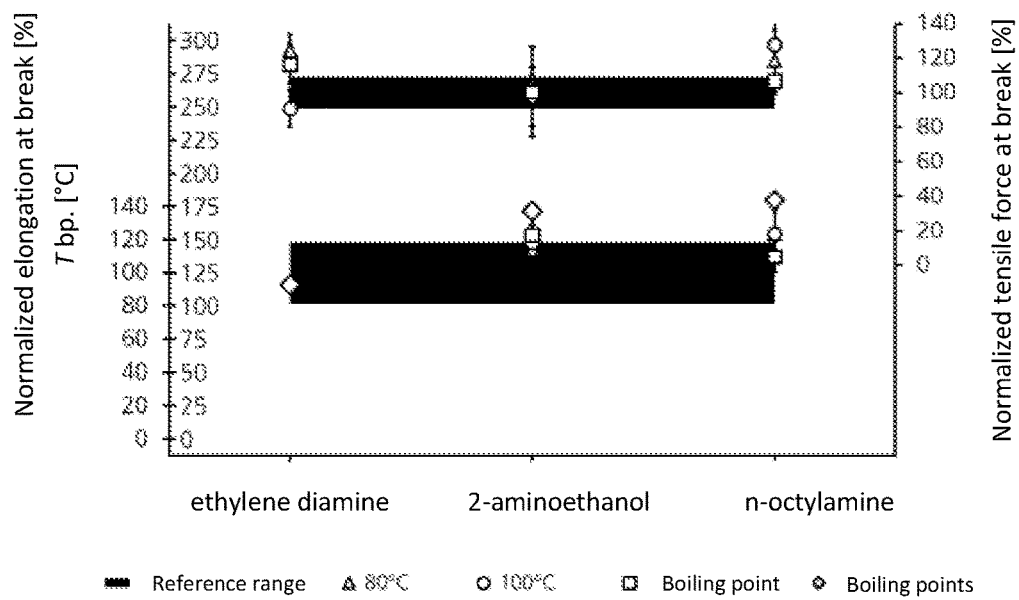

In the case of natural fibers, a significant negative effect on the mechanical properties was not recorded in any of the reagents at all three selected temperatures (see FIG. 4). Particularly noteworthy here is the strong increase in the elongation at break after storage in ethylene diamine. This supports the assumption that flax fibers are chemically modified in these experiments when stored in ethylene diamine.

Figure 5:
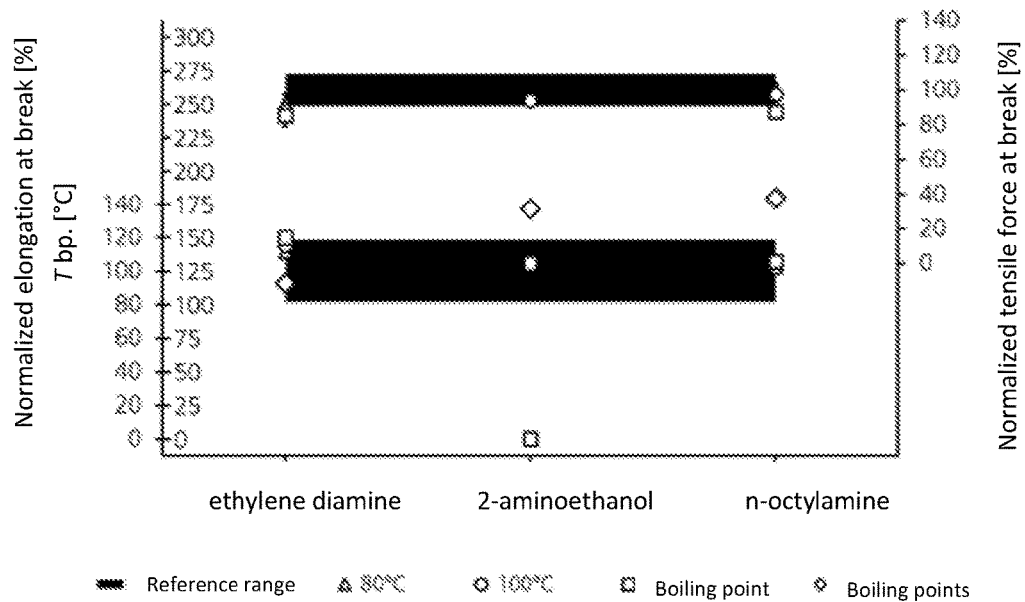

The polyamide fibers (PA 6) are an exception in the context of the work performed here on the resistance to chemicals of reinforcing fibers. It was discovered that polyamide 6 fibers dissolve in refluxing 2-aminoethanol, while the polyamide is not soluble in less polar and/or low-boiling reagents. It was also found that ethylene and n-octylamine were particularly suitable for decomposing polyamide-containing composite plastics, since even under refluxing conditions, no significant effect on the mechanical properties can be observed (see FIG. 5).

Example 12

Figure 6:
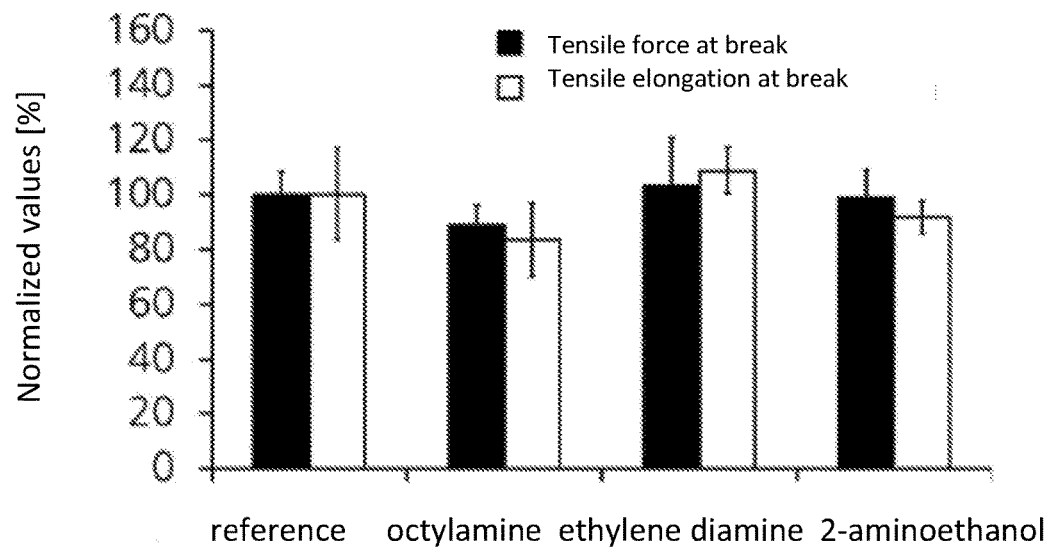
Figure 7:
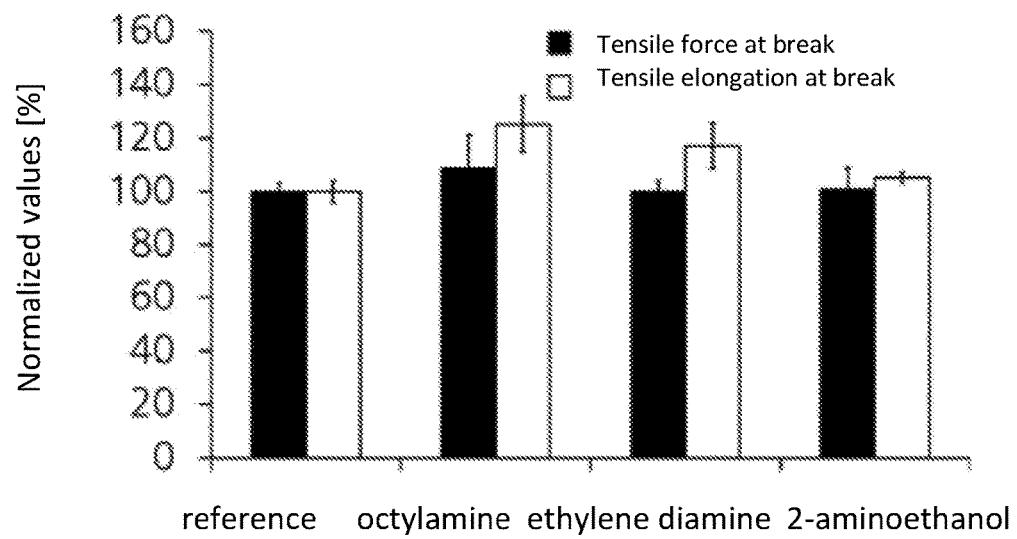

As in Example 11, the test fibers were stored in 50 ml round bottom flasks with Dimroth condenser. FIGS. 6 and 7 show the results of tensile tests (tensile force on the left, darker bar respectively, tensile elongation right, brighter bars respectively) on untreated carbon fiber rovings and on carbon fiber rovings stored for 24 h in the refluxing reagents (FIG. 6) or glass fibers (FIG. 7). The following table shows an overview of the reagents used and their boiling points. The fibers are not damaged by the reagents tested and could therefore be used again as reinforcing fibers, after a benzoxazine resin-containing matrix is decomposed.

| Reagent | $T_{bp.}$ [° C.] |
|---|---|
| n-Octylamine | 180 |
| Ethylenediamine | 116 |
| 2-Aminoethanol | 172 |

Example 13

6 g of a bisphenol A-based benzoxazine resin cured as in Example 1 was subjected to aminolysis in 24 g of 2-aminoethanol at a temperature of 172° C. under reflux for 2 h. The excess reagent was removed by distillation using a rotary evaporator under vacuum at 10 mbar and an oil bath temperature of 150° C.

20.0% by mass of the breakdown products that are highly viscous at room temperature were melted at 130° C. and mixed with 11.8% by mass of 1,4-butanediol. The resulting mixture was added to 68.2% by mass of a hexamethylene-1,6-diisocyanate-based (HDI) trimer. The components were then homogenized for 2 minutes with a planetary mixer. The material was then cured for 24 h at room temperature and post-cured in a circulating air oven for 0.5 h at 150° C. The produced material is a polyurethane foam with closed cells.

Figure 8:
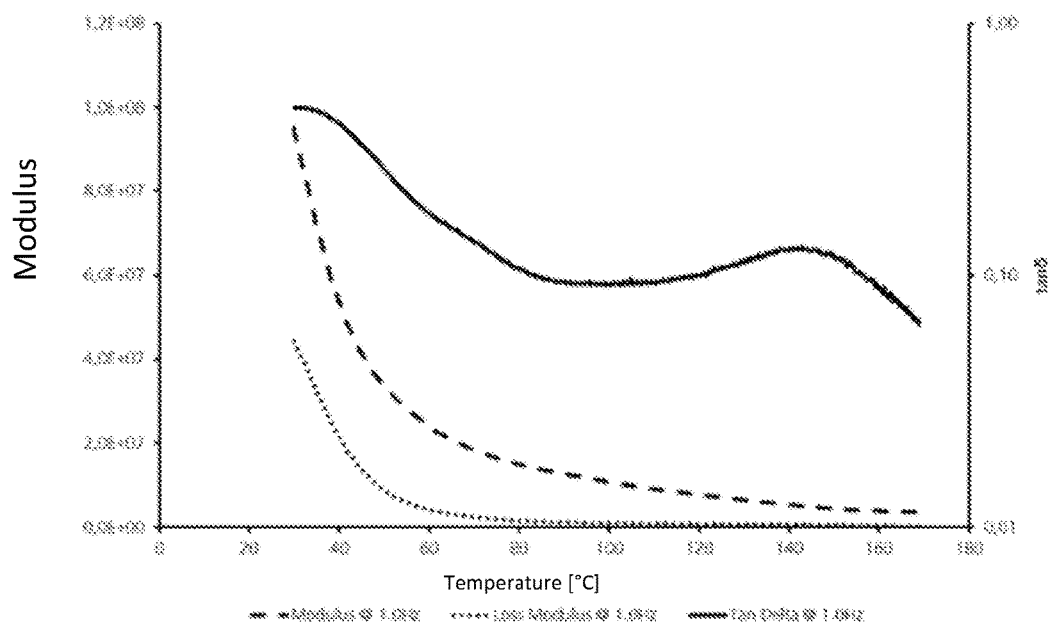

The cured material was characterized by DMA using Single Cantilever equipment. The curves measured by DMA and the respective tanδ are shown in FIG. 8. The polymer foam produced in this manner has a glass transition temperature of approximately 30° C. (tan $\delta_{max}$).

The produced polymer is insoluble in the following organic solvents: ethanol, methanol, methyl ethyl ketone, acetone, tetrahydrofuran, dimethyl sulfoxide, chloroform.

Due to the polymer network formation verified by DMA, the degradation products used here must contain functional groups that can react with isocyanates. These are in particular terminal hydroxyl and amino compounds.

Example 14

The recycled material was prepared as described for Example 13.

16.6% by mass of the highly viscous recycled material were melted at 130° C. and dissolved in 9.8% by mass of 1,4-butanediol. The resulting solution was added to 73.6% by mass of a hexamethylene-1,6-diisocyanate-based (HDI) trimer. The components were then homogenized for 2 minutes with a planetary mixer.

Figure 9:
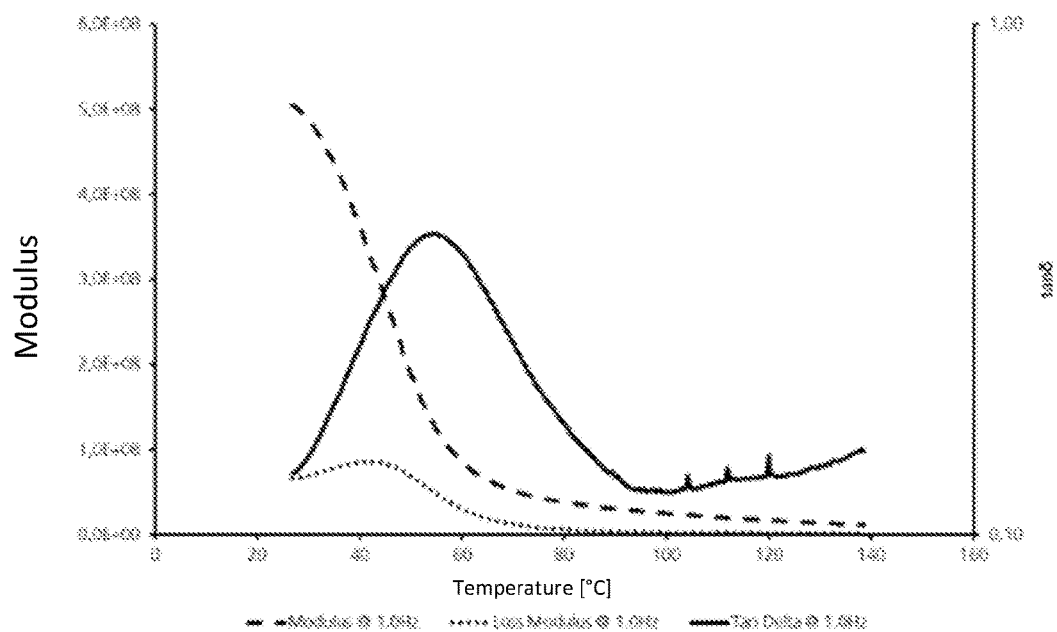

The cured material was characterized by DMA with Single Cantilever equipment. The curves measured by DMA and the respective tanδ are shown in FIG. 9. The hard foam produced in this manner has a glass transition temperature of approx. 53° C. (tan $\delta_{max}$).

The produced polymer is insoluble in the following organic solvents: ethanol, methanol, methyl ethyl ketone, acetone, tetrahydrofuran, dimethyl sulfoxide, chloroform.

Due to the polymer network formation verified by DMA, the degradation products used here must contain functional groups that can react with isocyanates. These are in particular terminal hydroxyl and amino compounds.

What is claimed is:

1. A process for degrading benzoxazine resin-containing materials, wherein the benzoxazine resin-containing material is subjected to aminolysis with an agent containing at least one reactive NH$_2$ group and/or NH group.

2. The process as recited in claim 1, wherein the agent containing the at least one reactive NH$_2$ group and/or NH group is an aliphatic or aromatic amine or hydrazine that can comprise other functional groups.

3. The process as recited in claim 1, wherein the agent containing the at least one reactive $NH_2$ group and/or NH group is an amino alcohol having the formula $NH_2$—Y—OH, where Y is a divalent aliphatic or aromatic residue.

4. The process as recited in claim 1, wherein the agent containing the at least one reactive $NH_2$ group and/or NH group is a diamine of formula $NH_2$—Y—$NH_2$, where Y is a divalent aliphatic or aromatic residue.

5. The process as recited in claim 1, wherein the reaction is performed in a solvent.

6. The process as recited in claim 5, wherein the solvent is tetrahydrofuran, dimethyl sulfoxide, ethanol, water, dioxane, dichloromethane, chloroform, dimethylformamide, or N-methyl-2-pyrrolidone.

7. The process as recited in claim 1, wherein the agent containing the at least one reactive $NH_2$ group and/or NH group is used as solvent, if needed under pressure in the condensed state, or after melting.

8. The process as recited in claim 1, wherein the process is performed at elevated temperature and/or elevated pressure.

9. The process as recited in claim 1, wherein the benzoxazine-containing material is reinforced with fibers.

10. The process as recited in claim 9, wherein the fibers are selected from carbon fibers, glass fibers, aramide fibers, basalt fibers, ceramic fibers, synthetic fibers and natural fibers, wherein after the breakdown of the benzoxazine-containing material the fibers are present in solid form in the solution of the agent containing the at least one $NH_2$ group and/or NH group and the degradation products of the benzoxazine-containing material.

11. The process as recited in claim 9, wherein the fibers are polyamide fibers.

12. The process as recited in claim 11, wherein the agent containing the reactive $NH_2$ groups and/or NH groups is selected from a primary amine and a diamine having two primary amino groups that do not contain any additional reactive substituents, preferably from an amine of formula R*$NH_2$, wherein R* is an unsubstituted hydrocarbon residue with preferably at least 6 carbon atoms or an alkylene diamine such as ethylene diamine, whereby after the degradation of the benzoxazine-containing material the fibers are present in solid form in the solution of the agent containing at least one $NH_2$ group and/or NH group and the degradation products of the benzoxazine-containing material.

13. The process as recited in claim 11, wherein the agent containing the reactive $NH_2$ groups and/or NH groups is selected from amino alcohols, in particular amino ethanol, whereby after the breakdown of the benzoxazine-containing material the breakdown product of the fibers are also present in solubilized form in the agent containing at least one $NH_2$ group and/or NH group.

14. A process for recycling a benzoxazine resin-containing material, comprising the degradation of the material as defined in claim 1, the removal of volatile products, preferably under reduced pressure and/or at elevated temperature, and the mixing of the material with one or more substances that react with the resultant degradation products under formation of a polymer network.

15. The process as recited in claim 14, wherein the material is mixed with an at least bifunctional isocyanate.

16. The process as recited in claim 5, wherein the reaction is performed in a cyclic ether, an alcohol, a chlorinated hydrocarbon or an N-containing solvent.

17. The process as recited in claim 15, wherein the bifunctional isocyanate is hexamethylene-1,6-diisocyanate-based (HDI-) trimer.

\* \* \* \* \*

UNITED STATES PATENT AND TRADEMARK OFFICE
CERTIFICATE OF CORRECTION

PATENT NO. : 10,501,600 B2
APPLICATION NO. : 15/745948
DATED : December 10, 2019
INVENTOR(S) : Dominik Soethje, Christian Dreyer and Monika Bauer Page 1 of 1

It is certified that error appears in the above-identified patent and that said Letters Patent is hereby corrected as shown below:

In the Specification

At Column 1, Line 63: Please delete "A"; and insert --Δ--

Signed and Sealed this
Eighth Day of September, 2020

Andrei Iancu
*Director of the United States Patent and Trademark Office*